United States Patent

Bickel et al.

[15] 3,678,486
[45] July 18, 1972

[54] MONITORING SYSTEM

[72] Inventors: David P. Bickel, Cuyahoga Falls; Melvin H. Davis, Northfield Center; Karl H. Starks, Jr., Tallmadge; John Tsoras, Akron, all of Ohio

[73] Assignee: The Goodyear Tire & Rubber Company, Akron, Ohio

[22] Filed: Oct. 16, 1969

[21] Appl. No.: 866,890

[52] U.S. Cl. ............................... 340/227, 73/340, 73/341, 340/223, 340/412
[51] Int. Cl. ............................. G08b 17/06, G08b 26/00
[58] Field of Search ............... 340/227, 231, 228, 412, 413, 340/180, 181, 213, 223, 183; 73/341, 361; 317/139; 307/117

[56] References Cited

UNITED STATES PATENTS

| | | | |
|---|---|---|---|
| 3,274,576 | 9/1966 | Guignard | 340/183 |
| 3,357,006 | 12/1967 | Wisniefski | 340/183 |
| 2,731,627 | 1/1956 | Herbst | 73/361 X |
| 2,901,739 | 8/1959 | Freitas | 340/413 |
| 3,065,462 | 11/1962 | Maltby et al. | 340/228 X |
| 3,068,450 | 12/1962 | Fletcher et al. | 340/413 X |
| 3,120,758 | 2/1964 | Craddock et al. | 340/183 X |
| 3,197,565 | 7/1965 | Yoder et al. | 340/183 X |
| 3,272,012 | 9/1966 | Seney | 73/341 |
| 3,459,925 | 8/1969 | Goosey et al. | 73/341 X |
| 3,483,555 | 12/1969 | Birard et al. | 340/413 |
| 3,073,164 | 1/1963 | Rorden et al. | 73/361 |

*Primary Examiner*—John W. Caldwell
*Assistant Examiner*—Scott F. Partridge
*Attorney*—Oldham & Oldham, F.W. Brunner and P. E. Milliken

[57] ABSTRACT

A temperature indication system particularly adapted for brake usages provided which includes a plurality of temperature sensors such as thermocouples cooperating with field effect transistor switches controlled by a digital decoder to effectively pass only one of a plurality of signals entering the switch at one time to a single amplifier. The output of the amplifier may be logically compared to provide a high temperature signal indication, or an exact temperature signal indication, depending upon the readout characteristics desired.

6 Claims, 1 Drawing Figure

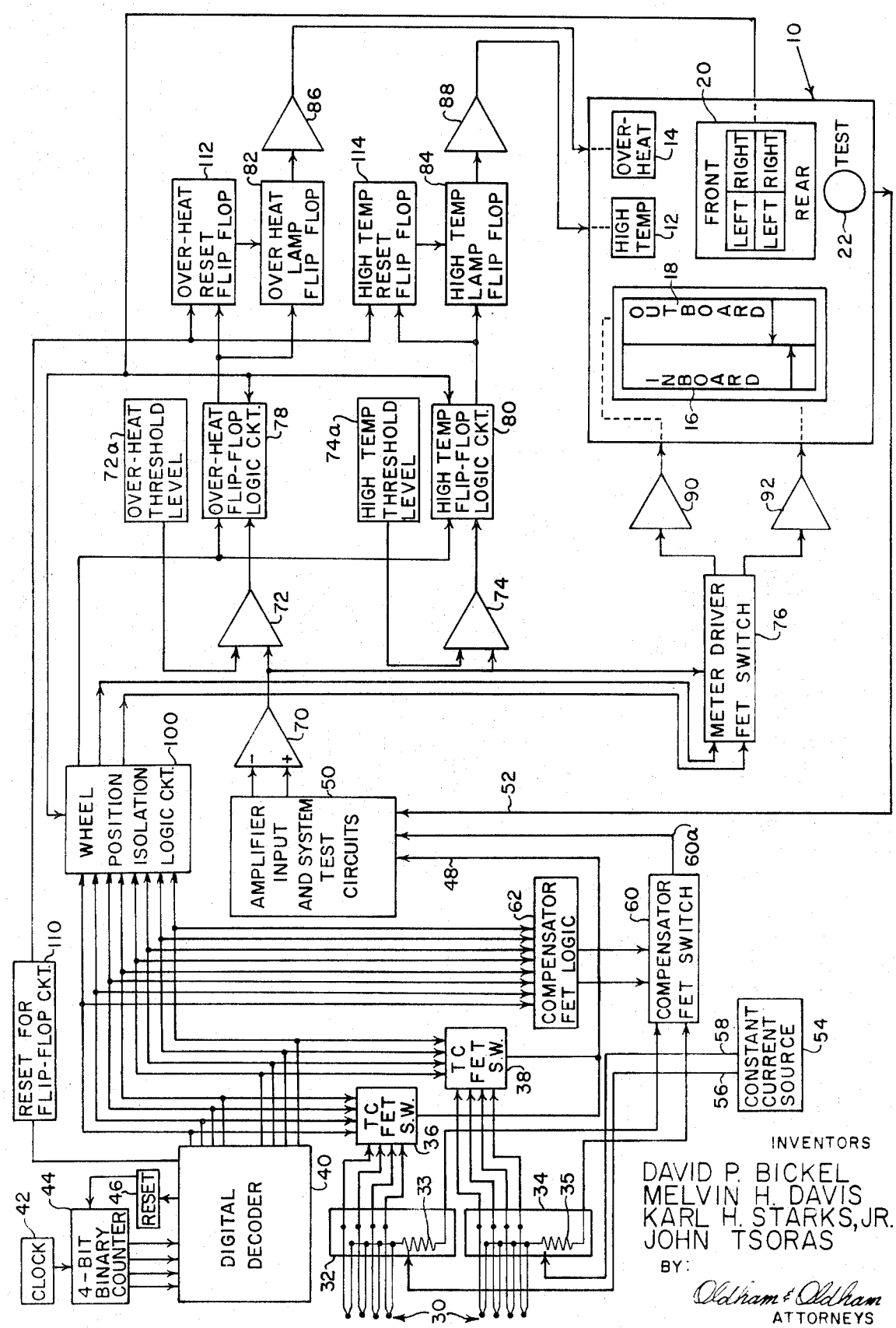

MONITORING SYSTEM

Heretofore it has been known that temperature indication systems have been utilized for such things as braked wheels, for example. However, in all these prior art systems each temperature sensor has its own amplifier and feeds to a direct readout device. Hence, there is a considerable duplication of components.

In a system where there are many temperature indication sensors, as for example on a large aircraft where there might be as many as 16 or 32 wheels, or for a large truck, or the like, where there will be a plurality of brakes to be monitored for temperature, a concept utilizing multiplexing techniques appears to offer distinct advantages in terms of cost, parts count and reliability.

Therefore, it is the general object of the invention to provide a multiplex temperature sensor approach to solve a problem where a plurality of sensors are involved and duplication of amplification and readout equipment is undesirable.

A further object of the invention is to provide a highly reliable multiplexing system for thermal indication from a plurality of sensors that utilizes a field effect transistor network in combination with an electronic controlled clock logic circuit to utilize only a single amplifier with an appropriate readout or display system.

The aforesaid objects of the invention and other objects which will become apparent as the description proceeds are achieved by providing a temperature indication system which comprises a plurality of temperature sensors producing an output signal indicating temperature, selective switch means receiving the temperature signals, amplifier means to amplify signals received from the switch means, and logic means to control the switch means to sequentially pass only one temperature signal at a time to the amplifier means.

For a better understanding of the invention, reference should be had to the accompanying drawing which is a block diagram schematic illustration of the system comprising the preferred embodiment of the invention.

With reference to the form of the invention illustrated in the drawing, the numeral 10 indicates a display console which is particularly adapted to show temperature indication for eight wheels of an aircraft with four wheels on each of a left and right strut. The console includes high temperature and overheat temperature indicators 12 and 14, respectively, which normally will be lights. Actual scaled indicators 16 and 18 are provided for the inboard and outboard wheels, respectively with these being controlled by a front-rear, left-right switch indicated generally by numeral 20. The remaining component on the panel 10 is a test button 22 which function will be described more fully hereinafter.

SYSTEM COMPONENTS

In the example illustrated in the drawing, eight thermocouples, each separate components, but indicated generally by numeral 30, are appropriately positioned with respect to a brake structure, housing, or any other location desired to provide an electrical signal indication of the temperature of the component with which they are associated. Each thermocouple is separately positioned. The thermocouples 30 feed into a pair of junction boxes 32 and 34, respectively. The junction boxes are standard components and simply provide a convenient location from which to feed and receive the thermocouple leads. Each junction box also carries a compensator 33 and 35, respectively, which is designed to compensate for variations in temperature of the transition junction from thermocouple wire to copper wire. In other words, the compensators establish a standard temperature at their respective junction boxes. In order to achieve proper operation of the compensators 33 and 35, a constant current input source 54 supplies current thereto over lines 56 and 58, respectively.

Each of the thermocouples from the junction boxes 32 and 34 feed into respective FET switches 36 and 38 respectively. The switches 36 and 38 are controlled by digital decoder 40 which in effect is selecting one of the thermocouples to be read at any particular instant of time by cooperation of a clock driver 42 feeding through a four-bit binary counter 44 which cooperates with a recycle reset 46 between the decoder 40 and counter 44.

The switches 36 and 38 actually act as the multiplex switches, and the invention contemplates that the preferable switch will be a metal-oxide-silicon field effect transistor. In the "off" state, the FET switches represent a large impedance greater than $10^{12}$ ohms and in the system appear as an open circuit. The "on" resistance of the device could be as low as 1 ohm. This, being small in comparison with typical amplifier input described hereinafter, appears as essentially a short circuit. The digital decoder 40 in effect gates the FET switches 36 and 38 sequentially so that only a single output is represented on line 48 to an amplifier input adjust and test circuit 50, which sequentially represents the eight inputs.

The amplifier input and test circuit 50 not only receives the input from the FET switches 36 and 38 over line 48, but also receives a test input over line 52. The temperature compensation of the elements 33 and 35 is also multiplexed in a compensator field effect transistor switch 60 which is appropriately gated by a compensator FET logic circuit 62 driven appropriately by the digital decoder 40 in the same sequence as the FET switches 36 and 38, so that the output of one or the other of the compensators 33 and 35 is appropriately fed into the circuit 50 at the appropriate instant of time.

The output of the compensator FET switch 60 feeds over line 60a to the circuit 50. The output of the amplifier input adjust and test circuit 50 feeds to a precision amplifier 70. This is a typical precision amplifier and simply performs in the usual manner. The output of the amplifier is sent to an overheat comparator 72, a high temperature comparator 74 and a meter driver field effect transistor switch 76. The comparator 72 is adjustably set by an appropriate overheat threshold level control 72a, while in the same manner the comparator 74 is set by a high temperature threshold level control 74a. The output of the comparators 72 and 74 are sent to appropriate logic circuit flip-flops 78 and 80, respectively. These flip-flops in turn drive overheat lamp flip-flops and high temperature flip-flops 82 and 84, respectively. The flip-flops 82 and 84 drive through appropriate lamp driver circuits 86 and 88, respectively to effect turnon of the high temperature and overheat lamps 12 and 14.

The meter driver field effect transistor switch 76 has dual outputs and drives through appropriate amplifiers 90 and 92 to provide the electrical indication to the inboard and outboard thermal indicators 16 and 18, respectively. The particular high temperature or overheat indicator 12 or 14 cooperates through switch 20 to control a wheel position isolation logic circuit 100. The circuit 100 provides a controlled clock drive to the driver FET switch 76 as well as to the logic circuit for the overheat flip-flop 78 and high temperature flip-flop 80. Naturally, this interrelationship is well understood by those skilled in the art, and is quite easily accomplished with appropriate logic and clock drive to achieve the proper indicator on the panel 10 even through the FET switches 36, 38, 60, and 76 as well as the amplifier input circuit 50 and the precision amplifier 70 are common to all the thermocouple inputs.

In order to reset the flip-flops after each cycle has been completed by the digital decoder 40, an appropriate signal is sent from a reset for flip-flop circuit 110 which appropriately cooperates with an overheat reset flip-flop 112 and a high temperature reset flip-flop 114 so that the system is reset for the next cycle or readout desired.

Comparison of the multiplexing concept shows obvious advantages. First, a great reduction in the number of parts necessary for a straight system such as has been done by the prior art is achieved. This would be reflected in reduced cost and increased reliability while maintaining the same accuracy and operational requirements. A possible disadvantage to the multiplexing concept is the fact that the amplifier circuit is time shared by all channels so that the entire system would be inoperative if the amplifier or other time shared parts fail.

Hence, in operation, it is seen that upon proper energization of the clock 42, the digital decoder 40 will selectively sample each of the thermocouples 30 through the appropriate switches 36 and 38. These results are properly compensated by the information sent from switch 60 to the circuit 50. The resultant output is sent to amplifier 70 and then to overheat comparator 72 and high temperature comparator 74 and meter driver switch 76. Through appropriate logic circuitry and amplifiers, the high temperature light 12 or overheat light 14 are activated depending upon the appropriate wheel or unit energized by switch 20 on the control panel 10. The meter driver switch shows the exact temperature on the inboard and outboard wheels over gauges 16 and 18, again as properly energized by the switch 20, and selectively sampling only those appropriate thermocouple sensors associated with the selected components. The test switch 22 simply provides an electrical input to the circuit 50 of sufficient magnitude to indicate high temperature to determine whether all components in the system are operative by sending this signal directly to the precision amplifier 70. The test signal will be one that will cause high temperature or overheat temperature, or both to indicate that the system is operative so that when the test button is punched, the lights should come on.

While in accordance with the patent statutes only the best known embodiment of the invention has been illustrated and described in detail, it is to be particularly understood that the invention is not limited thereto or thereby, but that the inventive scope is defined in the appended claims.

What is claimed is:

1. A system for monitoring and indicating the temperatures of a plurality of brakes in a vehicle, comprising:
   a plurality of temperature sensors, at least one sensor being located at each brake, each sensor producing an electrical output signal proportional to the temperature of the sensor location,
   at least one junction box located near the sensors and receiving the sensors signals therein,
   a single temperature compensation circuit associated with each junction box and cooperating with all the sensors associated with each respective box and producing an electrical output signal indicative of the temperature in the junction box,
   two separate multiplexing circuits comprising a common clock driving a common digital decoder, separate field effect transistor switches for multiplexing the sensor signals and the compensator signals separately, and a common amplifier receiving and combining the sensor and compensator signals,
   logic means to control the switches to sequentially actuate to pass only one temperature signal and its respective compensation signal at a time to the common amplifier, and
   circuit means to receive the amplified signals and provide an indication thereof.

2. A system according to claim 1 where the logic means includes a circuit to continuously recycle the multiplexing circuits after all switches have been sequentially actuated.

3. A system according to claim 1 where there are at least two separate junction boxes each associated with sensors located in proximity thereto.

4. A system according to claim 1 where the vehicle is an airplane having at least two wheel and brake carrying struts, said sensors associated with the brakes for the wheels, and a junction box mounted to each respective strut.

5. A temperature indication system according to claim 1 where the field effect transistor is a metal-oxide-silicon representing an impedance of greater than $10^{12}$ ohms in the off state and as little as about 1 ohm in the on state.

6. A system according to claim 1 which includes a control panel, switch means on the panel to selectively choose which sensor is to be read, and means to indicate high temperature with reference to a standard, overheat temperature, and visual indicator means to indicate the exact temperature of the selected sensor on the panel.

* * * * *